(12) United States Patent
Gangadhar et al.

(10) Patent No.: US 12,189,504 B2
(45) Date of Patent: Jan. 7, 2025

(54) SYSTEMS, METHODS, AND MEDIA FOR REDUCING THE IMPACT OF DRIVE PARAMETER WRITES ON SOLID STATE DRIVE PERFORMANCE

(71) Applicant: SK hynix NAND Product Solutions Corporation, San Jose, CA (US)

(72) Inventors: Sarvesh Varakabe Gangadhar, San Jose, CA (US); David J. Pelster, Longmont, CO (US); Bhargavi Govindarajan, Milpitas, CA (US); Archana Rajagopal, El Dorado Hills, CA (US); Mark Anthony Sumabat Golez, Folsom, CA (US); Yogesh Wakchaure, Folsom, CA (US)

(73) Assignee: SK hynix NAND Product Solutions Corporation, San Jose, CA (US)

( * ) Notice: Subject to any disclaimer, the term of this patent is extended or adjusted under 35 U.S.C. 154(b) by 0 days.

(21) Appl. No.: 17/903,854

(22) Filed: Sep. 6, 2022

(65) Prior Publication Data
US 2024/0095139 A1 Mar. 21, 2024

(51) Int. Cl.
G06F 11/00 (2006.01)
G06F 1/30 (2006.01)
(Continued)

(52) U.S. Cl.
CPC ............ G06F 11/3037 (2013.01); G06F 1/30 (2013.01); G06F 11/3452 (2013.01)

(58) Field of Classification Search
CPC .................. G06F 11/3037; G06F 11/3452
See application file for complete search history.

(56) References Cited

U.S. PATENT DOCUMENTS 10,242,734 B1 * 3/2019 Khakifirooz ....... G11C 16/3427
2009/0182962 A1 7/2009 Khmelnitsky et al.
(Continued)

FOREIGN PATENT DOCUMENTS

JP 2014142893 8/2014

OTHER PUBLICATIONS

International Search Report and Written Opinion dated Dec. 21, 2023 in International Patent Application No. PCT/US2023/032001, pp. 1-10.

*Primary Examiner* — Amine Riad
(74) *Attorney, Agent, or Firm* — Byrne Poh LLP

(57) ABSTRACT

Mechanisms for reducing the impact of drive parameter writes on solid state drive (SSD) performance are provided, the methods including: saving one or more SSD drive parameters of an SSD to volatile memory of the SSD using an SSD controller; detecting a power-loss condition in the SSD; and copying the one or more SSD drive parameters from the volatile memory of the SSD to non-volatile memory of the SSD. In some embodiments, the SSD is a NAND SSD. In some embodiments, the one or more SSD drive parameters include one or more of: a drive health parameter, a drive internal statistic, drive thermal information, drive debug information, a number of host and non-volatile memory read and writes, media error handling data, temperature and throttle information, and firmware download information. In some embodiments, the volatile memory is one or more of: random-access memory and dynamic random-access memory.

24 Claims, 4 Drawing Sheets

(51) Int. Cl.
  *G06F 11/30* (2006.01)
  *G06F 11/34* (2006.01)

(56) References Cited

U.S. PATENT DOCUMENTS

| | | |
|---|---|---|
| 2010/0199021 A1 | 8/2010 | Harper et al. |
| 2015/0058533 A1 | 2/2015 | El-Batal et al. |
| 2016/0118130 A1 | 4/2016 | Chadha et al. |

* cited by examiner

SYSTEMS, METHODS, AND MEDIA FOR REDUCING THE IMPACT OF DRIVE PARAMETER WRITES ON SOLID STATE DRIVE PERFORMANCE

BACKGROUND

Increasing the speed, Quality of Service (QoS), and the reliability of solid state drives (SSDs), such as NAND SSDs, continues to be of great importance to users as the devices in which these components are used have ever-increasing performance demands.

Drive parameters of SSDs include drive health parameters, drive internal statistics, drive thermal information, drive debug information, number of host and non-volatile memory read and writes, media error handling data, temperature and throttle information, firmware download information, etc., for example. Typically, a drive parameter is written to non-volatile memory of SSDs per policy, for example.

Drive parameter writes to non-volatile memory in SSDs reduce performance of the SSDs. For example, drive parameter writes can reduce SSD QoS metrics for random read workloads, which metrics measure response times by I/O completion percentages and are a key performance metric for the SSDs.

Accordingly, it is desirable to reduce the impact of drive parameter writes on SSD performance.

SUMMARY

In accordance with some embodiments, systems, methods, and media for reducing the impact of drive parameter writes on solid state drive performance are provided.

In some embodiments, methods of reducing the impact of drive parameter writes on solid state drive (SSD) performance are provided, the methods comprising: saving one or more SSD drive parameters of an SSD to volatile memory of the SSD using an SSD controller; detecting a power-loss condition in the SSD; and copying the one or more SSD drive parameters from the volatile memory of the SSD to non-volatile memory of the SSD. In some of these embodiments, the SSD is a NAND SSD. In some of these embodiments, the one or more SSD drive parameters include one or more of: a drive health parameter, a drive internal statistic, drive thermal information, drive debug information, a number of host and non-volatile memory read and writes, media error handling data, temperature and throttle information, and firmware download information. In some of these embodiments, the volatile memory is one or more of: random-access memory and dynamic random-access memory. In some of these embodiments, the power-loss condition is a supply voltage of the SSD dropping below a first threshold. In some of these embodiments, the non-volatile memory is NAND memory. In some of these embodiments, the method further comprises: detecting a power-restore condition in the SSD; and copying the one or more SSD drive parameters from the non-volatile memory of the SSD to the volatile memory of the SSD. In some of these embodiments, the power-restore condition is the supply voltage of the SSD rising above below a second threshold.

In some embodiments, solid state drives (SSDs) are provided, each of the SSDs comprising: non-volatile memory; volatile memory; and an SSD controller coupled to the non-volatile memory and the volatile memory, and configured to: save one or more solid state drive (SSD) drive parameters of the SSD to the volatile memory of the SSD; detect a power-loss condition in the SSD; and copy the one or more SSD drive parameters from the volatile memory of the SSD to the non-volatile memory of the SSD. In some of these embodiments, the SSD is a NAND SSD. In some of these embodiments, the one or more SSD drive parameters include one or more of: a drive health parameter, a drive internal statistic, drive thermal information, drive debug information, a number of host and non-volatile memory read and writes, media error handling data, temperature and throttle information, and firmware download information. In some of these embodiments, the volatile memory is one or more of: random-access memory and dynamic random-access memory. In some of these embodiments, the power-loss condition is a supply voltage of the SSD dropping below a first threshold. In some of these embodiments, the non-volatile memory is NAND memory. In some of these embodiments, the SSD controller is further configured to: detect a power-restore condition in the SSD; and copy the one or more SSD drive parameters from the non-volatile memory of the SSD to the volatile memory of the SSD. In some of these embodiments, the power-restore condition is the supply voltage of the SSD rising above below a second threshold.

In some embodiments, non-transitory computer-readable media containing computer executable instructions that, when executed by a SSD controller, cause the SSD controller to perform a method for reducing the impact of drive parameter writes on solid state drive (SSD) performance are provided, the method comprising: saving one or more SSD drive parameters of an SSD to volatile memory of the SSD; detecting a power-loss condition in the SSD; and copying the one or more SSD drive parameters from the volatile memory of the SSD to non-volatile memory of the SSD. In some of these embodiments, the SSD is a NAND SSD. In some of these embodiments, the one or more SSD drive parameters include one or more of: a drive health parameter, a drive internal statistic, drive thermal information, drive debug information, a number of host and non-volatile memory read and writes, media error handling data, temperature and throttle information, and firmware download information. In some of these embodiments, the volatile memory is one or more of: random-access memory and dynamic random-access memory. In some of these embodiments, the power-loss condition is a supply voltage of the SSD dropping below a first threshold. In some of these embodiments, the non-volatile memory is NAND memory. In some of these embodiments, the method further comprises: detecting a power-restore condition in the SSD; and copying the one or more SSD drive parameters from the non-volatile memory of the SSD to the volatile memory of the SSD. In some of these embodiments, the power-restore condition is the supply voltage of the SSD rising above below a second threshold.

DETAILED DESCRIPTION

Figure 1:
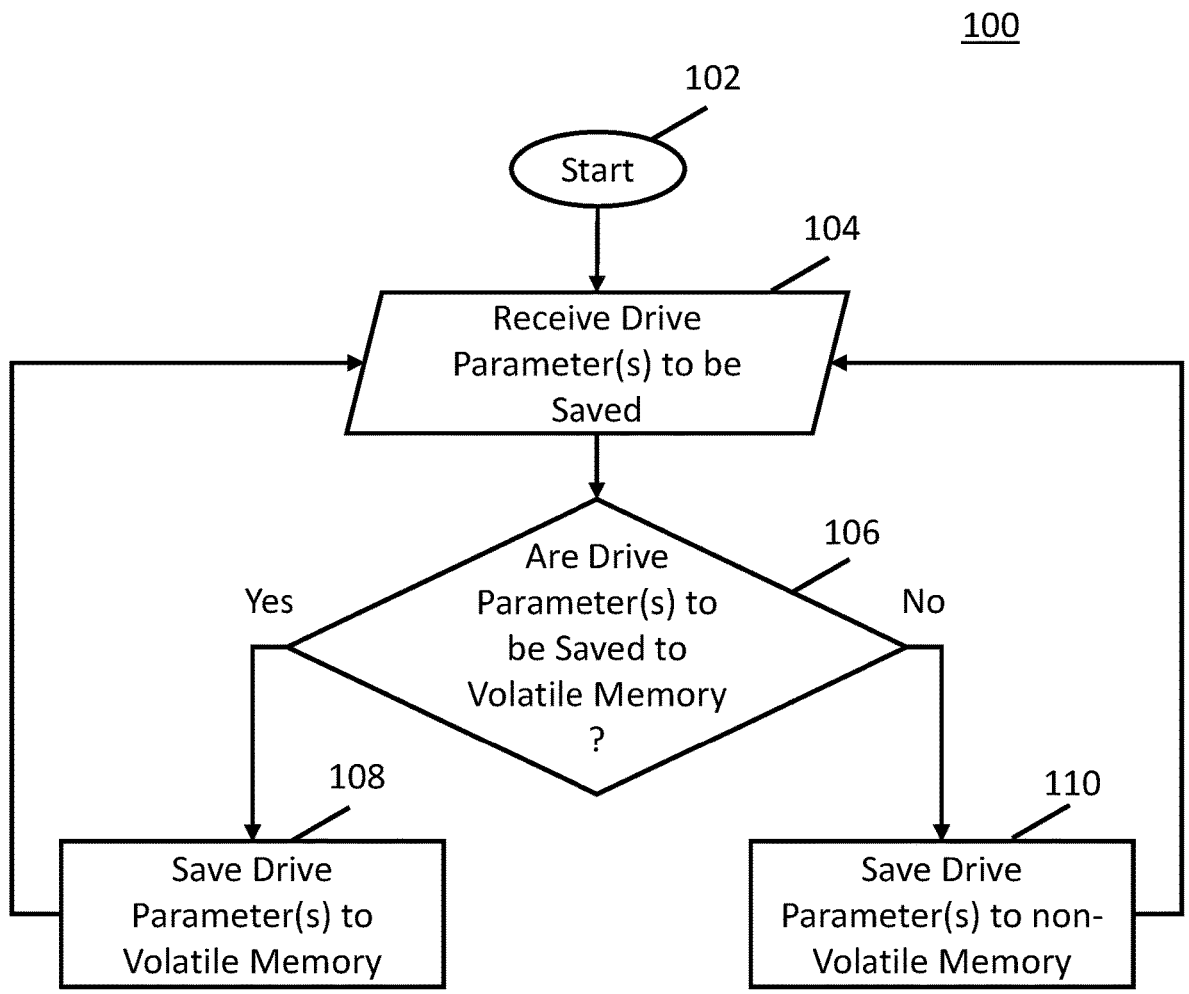
FIG. 1 is an example of a process for saving drive parameter data in accordance with embodiment some embodiments.

In accordance with some embodiments, mechanisms, which can include systems, methods, and media, for reducing the impact of drive parameter writes on solid state drive (SSD) performance are provided. In some embodiments, these mechanisms can be used to reduce the impact of drive parameter writes on NAND SSD performance.

In some embodiment, drive parameters, which can include drive health parameters, drive internal statistics, drive thermal information, drive debug information, number of host and non-volatile memory read and writes, media error handling data, temperature and throttle information, firmware download information, etc., can be written to volatile memory that is part of an SSD. For example, in some embodiments, the drive parameters can be written to volatile memory implemented using random access memory (RAM), such as dynamic RAM (DRAM), that is part of an SSD. In some embodiments, the volatile memory, e.g., RAM/DRAM memory, can be protected from loss due to power failure. For example, in some embodiments, this volatile memory, e.g., RAM/DRAM memory, can be connected to a power storage device that continues to provide power to the memory at least until the contents of the memory can be copied to another memory location that is non-volatile (such as a Power Loss Imminent (PLI) band of NAND memory) in an SSD.

In some embodiments, writing drive parameters to volatile memory that is part of an SSD can provide any one or more of the following benefits:
  It can improve the random read QoS performance of the SSD during non-PLI periods due to not performing drive parameter writes to non-volatile memory during this time;
  It can ensure that drive parameters are not lost during PLI events when the drive parameters are written to volatile memory that is connected to a power supply that continues to provide power to the volatile memory at least until the contents of the memory can be copied to another location that is non-volatile;
  It can reduce firmware overhead to service those writes as well as other latencies (such as Program Suspend Resume (PSR) and channel processing overhead);
  It can improve random read QoS performance without negatively impacting read/write performance or latency in other workloads;
  It can present a low complexity solution with a significant improvement to random read QoS, for example, at higher QoS confidence levels (e.g., 99.999%, 99.9999%, etc.); and
  It can reduce the overall writes in the system and thereby improve performance and QOS.

Below references are made to volatile and non-volatile memory. It should be understood that volatile memory can include any suitable volatile memory, such as RAM, DRAM, etc. in some embodiments. It should be understood that non-volatile memory can include any suitable non-volatile memory, such as NAND memory, NOR memory, phase change memory, etc. in some embodiments.

Below references are made to one or more SSDs. It should be understood that each of the one or more SSDs can include any suitable SSD, such as a NAND SSD, phase change memory SSD, etc.

Turning to FIG. 1, an example 100 of a process for saving drive parameter data in accordance with embodiment some embodiments is illustrated.

As shown, after process 100 begins at 102, the process receives one or more drive parameters to be saved at 104. Any suitable drive parameters can be received at 104, and these drive parameters can be received in any suitable manner, in some embodiments. For example, in some embodiments, the received drive parameters can include drive health parameters, drive internal statistics, drive thermal information, drive debug information, number of host and non-volatile memory read and writes, media error handling data, temperature and throttle information, firmware download information, etc. As another example, in some embodiments, the drive parameters can be internally generated or collected.

Next, at 106, process 100 can determine whether the received drive parameter(s) are to be save to volatile memory. This determination can be made in any suitable manner in some embodiments. For example, in some embodiments, process 100 can compare one or more identifiers for the drive parameter(s) to a list of drive parameters to be saved or not-to-be saved to volatile memory.

If it is determined at 106 that received drive parameter(s) are to be saved to volatile memory, process 100 can then save the drive parameter(s) to volatile memory at 108. Process 100 can save the drive parameter(s) to any suitable volatile memory, such as RAM or DRAM memory at any suitable location, such as on the SSD, in some embodiments. Process 100 can save the drive parameter(s) to the volatile memory in any suitable manner, in some embodiments. For example, in some embodiments, process 100 can save the drive parameter(s) to the volatile memory in a table of parameter keys and parameter values.

Otherwise, if it is determined at 106 that received drive parameter(s) are NOT to be saved to volatile memory, process 100 can then save the drive parameter(s) to non-volatile memory at 110. Process 100 can save the drive parameter(s) to any suitable non-volatile memory in any suitable manner, in some embodiments. For example, in some embodiments, process 100 can save the drive parameter(s) to NAND memory in an SSD. As another example, in some embodiments, process 100 can save the drive parameter(s) to the non-volatile memory as currently known in the art.

Once the drive parameter(s) have been saved at 108 or 110, process can loop back to 104 to wait for the receipt of more drive parameter(s) to be save.

Figure 2:
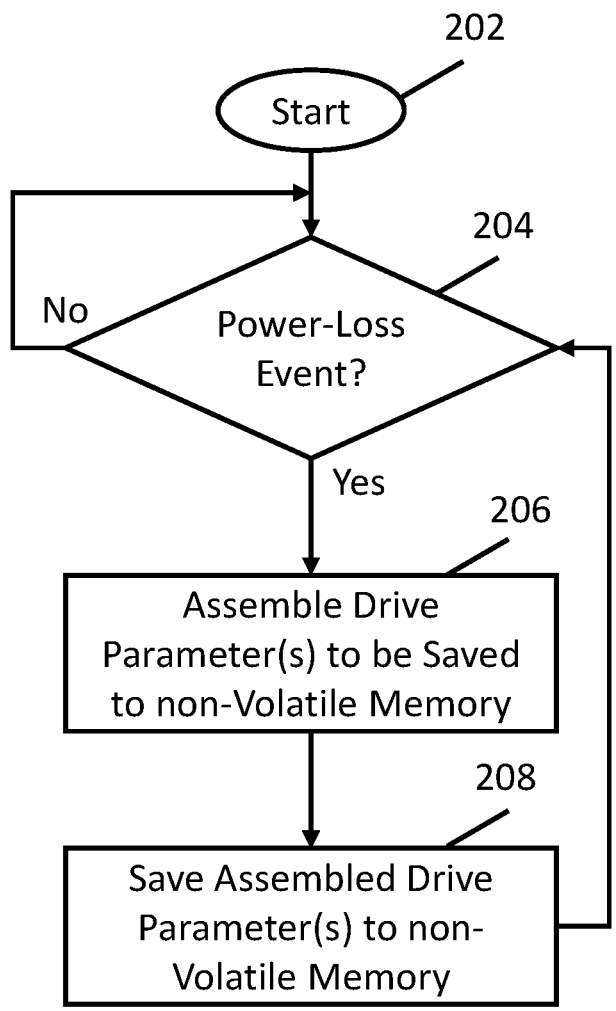
FIG. 2 is an example of a process for saving drive parameter(s) stored in volatile memory to non-volatile memory in response to a power-loss event in accordance with embodiment some embodiments.

Turning to FIG. 2, an example 200 of a process for saving drive parameter(s) stored in volatile memory to non-volatile memory, such as NAND memory, in response to a power-loss event (e.g., a power loss imminent (PLI) event) is illustrated.

As shown, after process 200 begins at 202, the process can determine if there is a power-loss event occurring at 204. This determination can be made in any suitable manner such as by determining that a supply voltage has dropped below a threshold level in some embodiments. Any suitable threshold level can be used, such as a percentage (e.g., 95%, 90%, 85%, 80%, etc.) of the supply voltage when not in a power-loss event, in some embodiments. In some embodiments, determining that a supply voltage has dropped below a threshold level can be performed by using a comparator to compare the supply voltage to a reference voltage set to the threshold level.

If it is determined at 204 that a power-loss event is NOT occurring, then process 200 can wait some period of time (or not in some embodiments) and loop back to 204. Otherwise, if it is determined at 204 that a power-loss event is occurring, then process 200 can assemble drive parameter(s) to be saved to non-volatile memory at 206. Assembling drive parameter(s) to be saved to non-volatile memory can be performed in any suitable manner in some embodiments. For example, in some embodiments, assembling drive parameter(s) to be saved to non-volatile memory can include copying from various portions of volatile memory to one portion of volatile memory components that need to be made power-loss safe.

After assembling the drive parameter(s) to be saved to non-volatile memory at 206, process 200 can save the assembled drive parameter(s) to non-volatile memory at 208. At 208, the assembled drive parameter(s) can be saved to any suitable non-volatile memory (such as NAND memory, NOR memory, phase change memory, etc.) and the saving can be performed in any suitable manner, in some embodiments. For example, the non-volatile memory can be a Power Loss Imminent (PLI) band of a NAND memory bank, in some embodiments.

Once the assembled drive parameter(s) have been saved to non-volatile memory at 208, process 200 can loop back to 204 in some embodiments.

Although process 200 is shown with repeatedly checking for power-loss events at 204, it should be understood that process 200 can replace 204 with block for receiving a signal indicating a power loss event, which can be an interrupt, in some embodiments.

Figure 3:
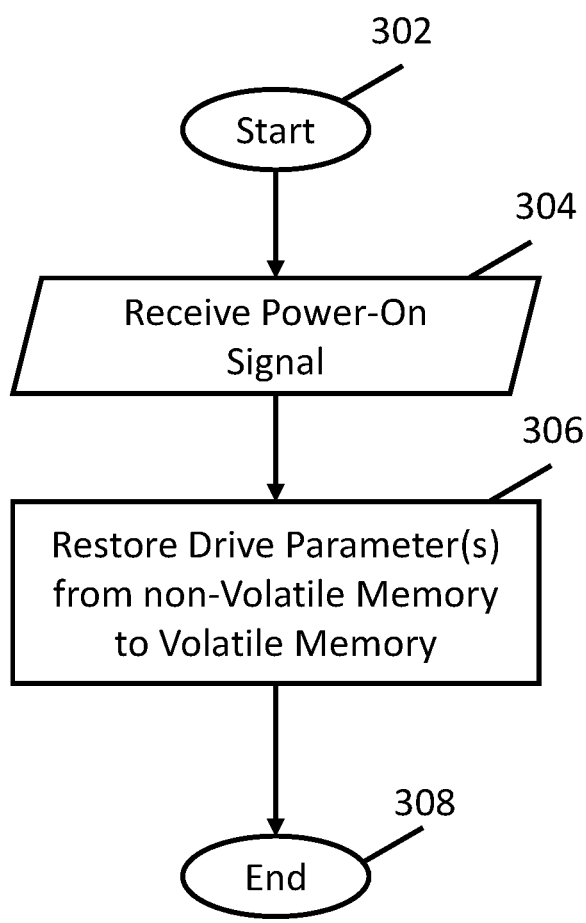
FIG. 3 is an example of a process for restoring drive parameters from non-volatile memory to volatile memory in response to a power-on signal in accordance with embodiment some embodiments.

Turning to FIG. 3, an example 300 of a process for restoring drive parameters from non-volatile memory to volatile memory in response to a power-on signal is illustrated.

As shown, after process 300 begins at 302, the process can receive a power-on signal indicating that power has been restored to an SSD. This power-on signal can be from any suitable source and can be received in any suitable manner. For example, in some embodiments, this signal can be generated by a comparator that determines that a supply voltage meets and/or exceeds a threshold level equal to some percentage (e.g., 95%, 90%, 85%, 80%, etc.) of the supply voltage when not in a power-loss event (e.g., a PLI event), in some embodiments.

After receiving the power-on signal indicating that power has been restored to an SSD, process 300 can restore the drive parameter(s) from non-volatile memory (such as a PLI band of NAND memory) to volatile memory (such as RAM/DRAM memory), in some embodiments. Restoring the drive parameter(s) can be performed in any suitable manner in some embodiments.

Once the drive parameter(s) have been restored to volatile memory at 306, process 300 can end at 308 in some embodiments.

Figure 4:
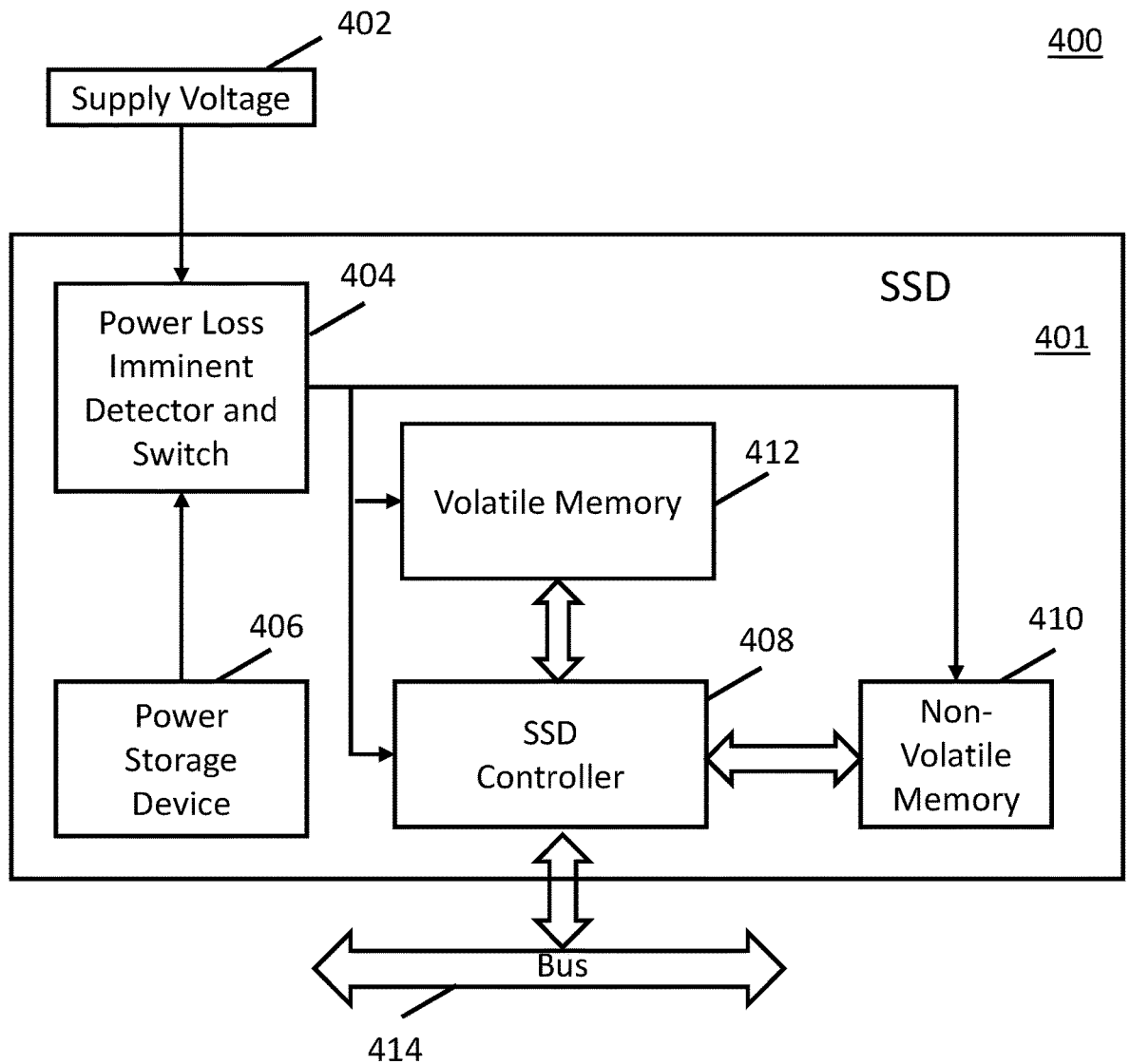
FIG. 4 is an example block diagram including some components of a SSD relevant to the processes of FIGS. 1-3 in accordance with embodiment some embodiments.

Turning to FIG. 4, an example block diagram 400 including some components of an SSD 401 relevant to the processes of FIGS. 1-3 in accordance with some embodiments is illustrated. As shown, SSD 401 is connected to a supply voltage 402 and a bus 414. Supply voltage 402 can be any suitable voltage 402 for powering SSD 401 in some embodiments. Bus 414 can be any suitable bus for connecting SSD 401 to a host device, such as a general or special purpose computers (e.g., a server, a laptop computer, a desktop computer, a tablet computer, a mobile telephone, a gateway, a router, and/or any other devices capable of connecting to an SSD). For example, in some embodiments, bus 414 can be a PCIE bus. As another example, in some embodiments, bus 414 can be a SATA bus.

As illustrated in FIG. 4, SSD 401 can include a Power-Loss Imminent (PLI) detector and switch 404, a power storage device 406, an SSD controller 408, non-volatile memory 410, volatile memory 412, and/or any other suitable device(s) not shown.

PLI detector and switch 404 can be any suitable component or combination of components for detecting an imminent power loss and switching SSD components from being powered by supply voltage 402 or being powered by power storage device 406. For example, in some embodiments, PLI detector and switch 404 can include one or more comparators that compare the supply voltage to one or more thresholds (e.g., one threshold to detect a pending power loss (e.g., <=90% of normal supply voltage or any other suitable percentage of normal supply voltage) and one threshold to detect a power restoration (e.g., >=95% of normal supply voltage or any other suitable percentage of normal supply voltage)). As another example, in some embodiments, PLI detector and switch 404 can include one or more switches (e.g., MOSFETs) that can be used to switch the power provided to the SSD components as coming from either supply voltage 402 or power storage device 406 in response to the output out the one or more comparators.

Power storage device 406 can be any suitable one or more components for storing power to be provided to components of SSD 401 in a power-loss event. For example, in some embodiments, power storage device 406 can be one or more capacitors, which can be implemented in any suitable manner in some embodiments. As another example, in some embodiments, power storage device 406 can be one or more batteries, which can be implemented in any suitable manner in some embodiments.

SSD controller 408 can be any suitable one or more device for collectively controlling the operation of SSD 401. For example, in some embodiments, SSD controller 408 can include a microprocessor, a micro-controller, digital signal processor(s), dedicated logic, and/or any other suitable circuitry for controlling the operation of SSD 401. As another example, in some embodiments, SSD controller 408 can include any suitable buffers, registers, memories, etc. for storing code and/or data used for controlling the operation of SSD 401.

Non-volatile memory 410 can be any suitable non-volatile memory, such as NAND memory, NOR memory, phase change memory, etc., in some embodiments.

Volatile memory 412 can be any suitable volatile memory in some embodiments. For example, in some embodiments, volatile memory 412 can be random access memory (RAM). More particularly, for example, in some embodiments, volatile memory 412 can be dynamic random-access memory (DRAM).

In some embodiments, at least some of the above-described blocks of the processes of FIGS. 1-3 can be executed or performed in any order or sequence not limited to the order and sequence shown in and described in connection with the figure. Also, some of the above blocks of FIGS. 1-3 can be executed or performed substantially simultaneously where appropriate or in parallel to reduce latency and processing times in some embodiments. Additionally or alternatively, some of the above described blocks of the processes of FIGS. 1-3 can be omitted in some embodiments. Additionally or alternatively, some of the above described blocks of the processes of FIGS. 1-3 can be combined into one processes in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method of reducing the impact of drive parameter writes on solid state drive (SSD) performance, comprising:
    saving one or more SSD drive parameters of an SSD to volatile memory of the SSD using an SSD controller;
    detecting a power-loss condition in the SSD; and
    in response to detecting the power-loss condition, copying the one or more SSD drive parameters from the volatile memory of the SSD to non-volatile memory of the SSD,
    wherein the SSD drive parameters include a drive health parameter.

2. The method of claim 1, wherein the SSD is a NAND SSD.

3. The method of claim 1, wherein the volatile memory is one or more of: random-access memory and dynamic random-access memory.

4. The method of claim 1, wherein the power-loss condition is a supply voltage of the SSD dropping below a first threshold.

5. The method of claim 1, wherein the non-volatile memory is NAND memory.

6. The method of claim 1, further comprising:
    detecting a power-restore condition in the SSD; and
    copying the one or more SSD drive parameters from the non-volatile memory of the SSD to the volatile memory of the SSD.

7. The method of claim 1, wherein the power-restore condition is the supply voltage of the SSD rising above below a second threshold.

8. The method of claim 1, wherein the SSD drive parameters include drive thermal information.

9. The method of claim 1, wherein the SSD drive parameters include drive debug information.

10. The method of claim 1, wherein the SSD drive parameters include a number of host read and writes.

11. The method of claim 1, wherein the SSD drive parameters include a number of non-volatile memory read and writes.

12. The method of claim 1, wherein the SSD drive parameters include media error handling data.

13. The method of claim 1, wherein the SSD drive parameters include temperature information.

14. The method of claim 1, wherein the SSD drive parameters include throttle information.

15. The method of claim 1, wherein the SSD drive parameters include firmware download information.

16. The method of claim 1, wherein the SSD drive parameters include a drive internal statistic.

17. A solid state drive (SSD) comprising:
    non-volatile memory;
    volatile memory; and
    an SSD controller coupled to the non-volatile memory and the volatile memory, and configured to:
        save one or more solid state drive (SSD) drive parameters of the SSD to the volatile memory of the SSD;
        detect a power-loss condition in the SSD; and
        in response to detecting the power-loss condition, copy the one or more SSD drive parameters from the volatile memory of the SSD to the non-volatile memory of the SSD,
        wherein the SSD drive parameters include a drive health parameter.

18. The SSD of claim 17, wherein the SSD is a NAND SSD.

19. The SSD of claim 17, wherein the volatile memory is one or more of: random-access memory and dynamic random-access memory.

20. The SSD of claim 17, wherein the power-loss condition is a supply voltage of the SSD dropping below a first threshold.

21. The SSD of claim 17, wherein the non-volatile memory is NAND memory.

22. The SSD of claim 17, wherein the SSD controller is further configured to:
    detect a power-restore condition in the SSD; and
    copy the one or more SSD drive parameters from the non-volatile memory of the SSD to the volatile memory of the SSD.

23. The SSD of claim 17, wherein the power-restore condition is the supply voltage of the SSD rising above below a second threshold.

24. A non-transitory computer-readable medium containing computer executable instructions that, when executed by a SSD controller, cause the SSD controller to perform a method for reducing the impact of drive parameter writes on solid state drive (SSD) performance, the method comprising:
    saving one or more SSD drive parameters of an SSD to volatile memory of the SSD;
    detecting a power-loss condition in the SSD; and
    in response to detecting the power-loss condition, copying the one or more SSD drive parameters from the volatile memory of the SSD to non-volatile memory of the SSD,
    wherein the SSD drive parameters include a drive health parameter.

* * * * *